United States Patent
Hamann et al.

(10) Patent No.: US 7,421,922 B2
(45) Date of Patent: Sep. 9, 2008

(54) DEVICE FOR LINEARLY MOVING A USEFUL MASS

(75) Inventors: Jens Hamann, Fürth (DE); Elmar Schäfers, Nürnberg (DE); Bernd Wedel, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 647 days.

(21) Appl. No.: 10/783,965

(22) Filed: Feb. 20, 2004

(65) Prior Publication Data
US 2004/0187621 A1    Sep. 30, 2004

(30) Foreign Application Priority Data
Feb. 20, 2003  (DE)  ................. 103 07 308

(51) Int. Cl.
*F16H 1/14*  (2006.01)

(52) U.S. Cl. ................ 74/424.76; 74/424.71; 74/424.5; 74/426

(58) Field of Classification Search .............. 74/424.76, 74/424.5, 424.71, 424.6, 426
See application file for complete search history.

(56) References Cited
U.S. PATENT DOCUMENTS

| 2,261,450 | A | * | 11/1941 | Pritchett | ................. | 81/106 |
| 5,337,627 | A | * | 8/1994 | Nakamura | ................ | 74/424.76 |
| 5,373,754 | A | * | 12/1994 | Takei | ................ | 74/424.76 |
| 6,189,372 | B1 | * | 2/2001 | Danz | ................ | 73/66 |
| 6,314,707 | B1 | * | 11/2001 | Ryan | ................ | 56/246 |

FOREIGN PATENT DOCUMENTS

| DE | 298 19 647 U1 | 3/1999 |
| DE | 201 08 883 U1 | 11/2002 |

* cited by examiner

Primary Examiner—David M Fenstermacher
(74) Attorney, Agent, or Firm—Henry M. Feiereisen

(57) ABSTRACT

A device for linearly moving a useful mass is described. Typically, when a large useful mass is moved, relatively large forces are transferred by a spindle or a toothed rack to the corresponding machine or machine frame. These forces can be compensated by moving a compensating mass in the opposite direction of the useful mass.

2 Claims, 2 Drawing Sheets

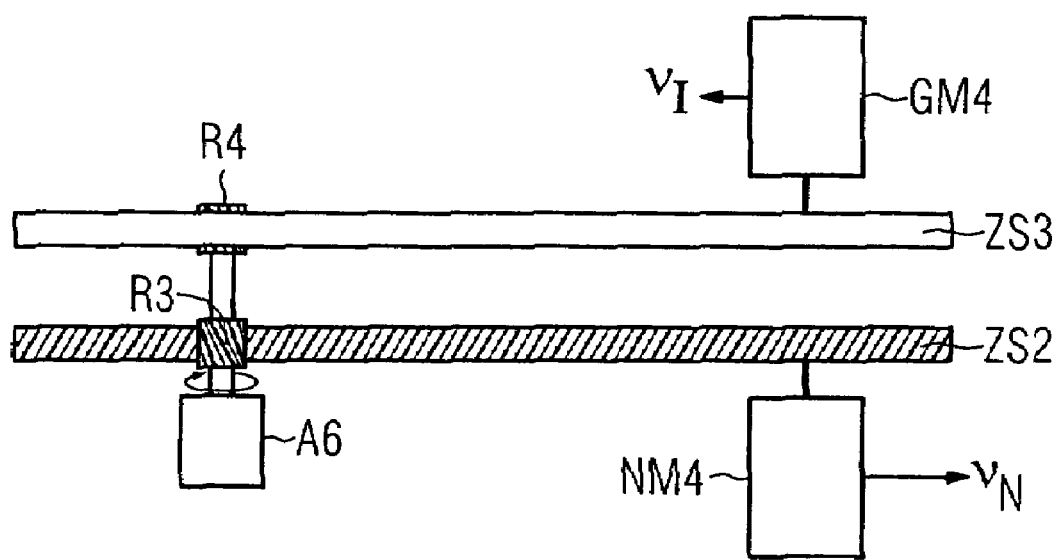

DEVICE FOR LINEARLY MOVING A USEFUL MASS

CROSS-REFERENCES TO RELATED APPLICATIONS

This application claims the priority of German Patent Application, Serial No. 103 07 308.6, filed Feb. 20, 2003, pursuant to 35 U.S.C. 119(a)-(d), the disclosure of which is incorporated herein by reference.

BACKGROUND OF THE INVENTION

The present invention relates to a device for linearly moving a useful mass and by decoupling the momentum generated during the movement of the useful mass from the machine or machine foundation.

Devices of this type have been used since many years with machine tools. It is also known that dynamic processes used to accelerate useful masses along linear axes produce significant forces that have to be transferred to or absorbed by the machine bed or machine foundation. Dynamic movements along one axis can accidentally be transferred through the machine bed to another axis, which can result in processing inaccuracies, in particular workpieces that have low-quality surfaces. In addition, when a rotary motion is transformed into a translational motion—either by a transformation through a ball roller spindle or alternatively a rack/pinion assembly—the forces generated by the linear element can result in a loss in stiffness of the entire system. The transformation from a rotary motion into a translational motion is in general also associated with a significant loss in stiffness, which can be aggravated by the elasticity of the machine bed and/or the support of the drive train. This limits the dynamic characteristic of the machine, unless substantial changes are made in the machine design.

It would be desirable and advantageous to provide devices of this type so as to reduce and/or compensate disturbances caused by the motion transformation.

It would also be desirable and advantageous to provide an improved device for moving useful masses, which obviates prior art shortcomings and is able to specifically reduce the momentum transferred to the machine or machine foundation and compensate for disturbances caused by the transformation from rotary to translational motion.

SUMMARY OF THE INVENTION

According to one aspect of the invention, a device for linearly moving a useful mass includes at least one spindle, at least one drive rotating the at least one spindle, a first spindle nut coupled with the useful mass and moving the useful mass in a first direction, and a second spindle nut coupled with a compensating mass and moving the compensating mass synchronously with the useful mass in a second direction opposite to the first direction, so that a momentum of the useful mass is compensated by a momentum of the compensating mass.

According to another advantageous aspect of the invention, a device for linearly moving a useful mass includes at least one toothed rack, at least one pinion engaging with the toothed rack, and at least one drive rotatably driving the pinion. A pinion is coupled with the useful mass, and a pinion is coupled with a compensating mass and moves the compensating mass synchronously with the useful mass in a second direction opposite to the first direction, so that a momentum of the useful mass is compensated by a momentum of the compensating mass.

According to an advantageous feature of the invention, the useful mass and the compensating mass can be moved in cooperation with a spindle that has two threads with an opposite lead, whereby the thread pitch for driving the compensating mass is smaller than the thread pitch for driving the useful mass. The travel of the compensating mass is thus kept small and the compensating mass can move at a relatively low speed, which advantageously reduces the power requirement.

According to an advantageous feature of the invention, the useful mass and the compensating mass can also be moved by using corresponding spindle/spindle-nut assemblies associated with drives. Mechanical coupling elements can be employed to maintain a linear alignment between the assemblies and absorb the forces generated in the two spindles. The mechanical coupling element can be implemented either by providing a rotatable connection between the spindles or by connecting both spindles with each other through a base frame, or both.

According to an advantageous feature of the invention, in the device employing a rack/pinion assembly, one pinion can have more closely spaced teeth while the other pinion has more widely spaced teeth. Alternatively or in combination, one pinion can have a smaller diameter while the other pinion can have a larger diameter. The pinions can move on two racks that face each other in opposite directions. The racks with the more widely spaced teeth and/or the larger diameter is connected with the useful mass, while the other pinion with the more closely spaced teeth and/or the smaller diameter drives the compensating mass.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 4 is a schematic illustration of a second embodiment of a rack/pinion assembly with a single drive and pinions having different diameters/tooth spacings.

DETAILED DESCRIPTION OF PREFERRED EMBODIMENTS

Figure 1:
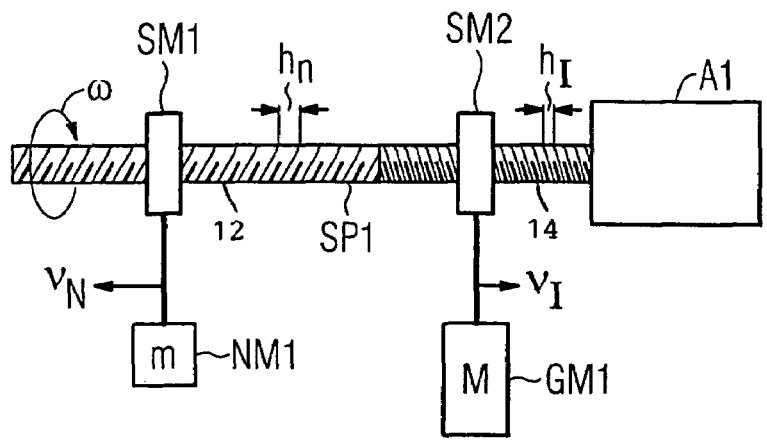
FIG. 1 is a schematic illustration of a first embodiment of a spindle assembly according to the present invention, including a single drive and a ball roller spindle with opposite lead.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a first embodiment of the invention with a single solid spindle SP1 coupled to a drive A1, in the present example a direct drive. The spindle SP1 can rotate, for example, with a speed ω in the rotation direction indicated by a curved arrow. The exemplary spindle SP1 has a left-handed threaded section 12 with a relatively high pitch $h_N$ and a right-handed threaded section 14 with a pitch $h_I$ that is comparatively smaller than the pitch $h_N$. The threaded section 12 engages with a spindle nut SM1 that is connected with a useful mass NM1, as indicated by a heavy line. The useful mass NM1 has an exemplary physical mass m. In the right-handed threaded 14 of the spindle SP1 engages with a spindle nut SM2 that is mechanically connected with a compensating mass GM1 having an exemplary physical mass M. When the spindle SP1 rotates with the rotation speed ω, then the opposing lead of the spindle thread causes the spindle nuts SM1 and SM2 to move in opposite directions, as indicated in FIG. 1, with corresponding speeds $v_N$ and $v_I$. It follows:

$$v_N = \omega \cdot \frac{h_N}{2\pi}$$

and since the compensating mass moves in the opposite direction $$v_I = -\omega \cdot \frac{h_I}{2\pi}$$

The force $F_N$ required to accelerate the useful mass NM1 with the physical mass m is:

$$F_N = m \cdot \frac{h_N}{2\pi} \omega$$

whereas the force $F_I$ required to accelerate the compensating mass GM1 with the physical mass M is:

$$F_I = m \cdot \frac{h_I}{2\pi} \omega$$

The forces $F_N$ and $F_I$ are fully compensated if $|F_N|=|F_I|$, i.e. both forces have the same magnitude. This is the case when the product of mass and spindle pitch are equal:

$$M \cdot h_I = m \cdot h_N$$

Advantageously, the compensating mass GM1 and the physical mass M associated therewith should be made as large as possible and the corresponding pitch $h_I$ as small as possible for the following two reasons:

On one hand, a small travel path for moving this additional element advantageously also reduces the size of the required installation space. On the other hand, it is known from mechanical principles that the work to be performed by the system increases linearly with the mass and as the square of the speed. Conversely, the transferred momentum increases linearly with both the mass and the speed. In other words, for the same transferred momentum, the required work doubles when the mass is doubled and the speed remains the same, whereas four times the work is required when the speed doubles and the mass remains the same. Making the compensating mass as large as possible is therefore advantageous to decrease the energy consumption.

Figure 2:
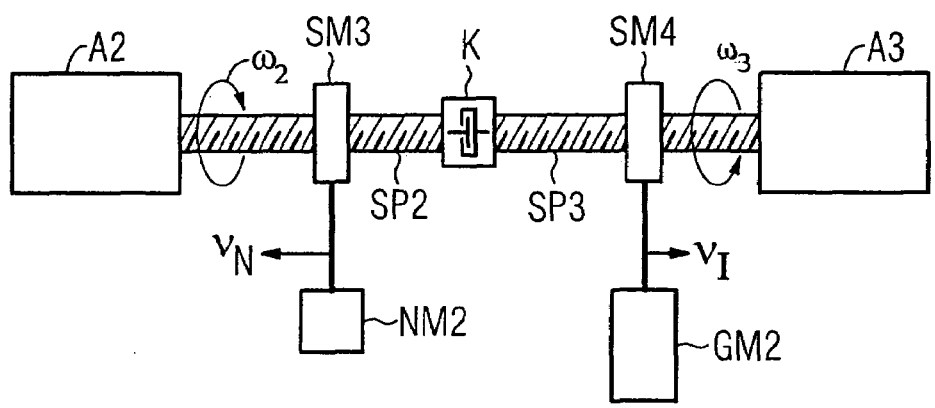
FIG. 2 is a schematic illustration of a second embodiment of a spindle assembly according to the present invention, including two driven ball roller spindles connected by a mechanical coupling.

FIG. 2 illustrates another embodiment using two spindles SP2 and SP3 having the same pitch. However, this embodiment requires two drives A2 and A3, with the drive A2 driving the spindle SP2 and the drive A3 driving the spindle SP3. As in the first embodiment depicted in FIG. 1, the spindle SP2 engages with a spindle nut SM3 that is connected with a useful mass NM2, as indicated by a heavy line. Likewise, the spindle SP3 engages with a spindle nut SM4 that is connected with a compensating mass GM2. The curved arrows indicate the rotation speeds $\omega_2$ and $\omega_3$ which are preferably different from each other for the reasons listed above. The straight arrows indicate the corresponding speeds $v_N$ and $v_I$ of the masses NM2 and NM3. Corresponding physical masses (not indicated in FIG. 2) are associated with the masses NM2 and NM3, with the compensating mass GM2 preferably being significantly greater than the useful mass NM2, as before. The spindle SP2 is connected via a coupling K, for example an articulated joint, with the spindle SP3 in such a way that the spindle SP2 is collinear with the spindle SP3. The axial forces of the two spindles SP2 and SP3 are then compensated over a short travel path.

As described above, the spindle SP3 has an identical pitch and also the same thread direction (or lead) as the spindle SP2. The desired linear speed $v_I$ of the compensating mass GM2 which is preferably smaller than the speed $v_N$ of the useful mass NM2 and in the opposite direction can be easily obtained by rotating the drive A3 that is connected with a spindle SP3 in the opposite direction to drive A2. The rotation speeds $\omega_2$ and $\omega_3$ can be adjusted according to the desired compensation.

When the useful mass is changed, the force in such system can be readily compensated by varying the rotation speed $\omega_3$ of the drive A3, without requiring a change in the compensating mass GM3.

Alternatively, instead of connecting the two spindles SP2 and SP3 with a coupling, frames or other components disposed between the two drive systems can also be employed to absorb the forces. The spindle/spindle-nut system can also include ball roller spindles.

Figure 3:
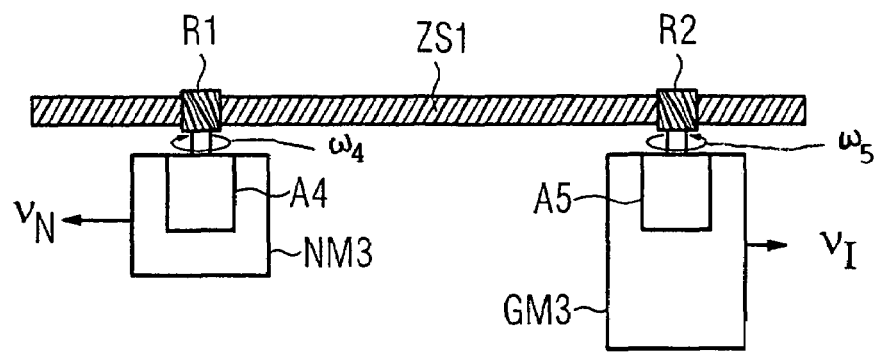
FIG. 3 is a schematic illustration of a first embodiment of a rack/pinion assembly with separate drives for the useful mass and the compensating mass.

FIG. 3 shows a third embodiment of the invention which employs a rack and pinion system instead of a spindle/spindle-nut system. This embodiment employs a stationary toothed rack ZS1 which engages with pinions R1 and R2. The exemplary useful mass NM3 is moved in a linear direction parallel to the rack ZS1 by a rotary drive A4 coupled to pinion R1 at a speed $v_N$. The rotary drive A4 rotates with an angular rotation speed $\omega_4$, as indicated by a curved arrow. A compensating mass GM3 is moved on the rack ZS1 in the opposite direction of the useful mass NM3 by a rotary drive A5 coupled to pinion R2 at a speed $v_I$. The rotary drive A5 rotates with an angular rotation speed $\omega_5$ in the opposite sense as the rotary drive A4. This arrangement eliminates or at least reduces undesired forces from being introduced by the toothed rack ZS into the machine. The equations for the physical motion listed above can be similarly applied to the rack/pinion configuration.

It will be understood that at least two racks can be used instead of the single rack depicted in FIG. 3.

FIG. 4 depicts yet another embodiment using two toothed racks ZS2 and ZS3 and two pinions R3 and R4 commonly driven by a drive A6. Pinion R3 engages with rack ZS2, whereas pinion R4 engages with rack ZS3. The racks ZS2 and ZS3 can be aligned parallel with each other, with the toothed section either facing each other or facing in the same direction. Other arrangements are also feasible, such as racks that are not parallel to each other and/or employ gears between pinions R3 and R4. Since it is desirable, as discussed above, to move the useful mass NM4 and the compensating mass GM4 at different linear speeds $v_N$ and $v_J$, respectively, the rack/pinion combinations ZS2/R3 and ZS3/R4 can either have different tooth spacings (pitch) or the pinions R3 and R4 can have different diameters, or both. Preferably, the teeth of the pinion R3 and the rack ZS2 have a wider spacing than the teeth of the pinion R4 and the rack ZS3. Likewise, pinion R3 has preferably a greater diameter than pinion R4. Accordingly, a compensating mass GM4 connected with the rack ZS3 is moved at a speed $v_J$ that is smaller than and in the opposite direction to the speed $v_N$ of the useful mass NM4 connected to rack ZS2.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A machine tool, comprising:

at least one spindle;

at least one drive rotating the at least one spindle;

a first spindle nut coupled with a first mass and moving the first mass in a first direction along the spindle, when the spindle rotates by the at least one drive; and a compensating second mass movable synchronously with the first mass in a second direction opposite to the first direction, so that a momentum of the first mass is canceled by a momentum of the second mass, wherein the at least one spindle has two threaded sections with opposite leads for commonly moving the first mass and the second mass, with one of the two threaded sections coupled to the second mass and having a pitch that is smaller than a pitch of the other one of the threaded section which is coupled to the first mass.

2. The machine tool of claim 1, further comprising a second said spindle driven by a second said drive, and a second spindle nut mounted to the second spindle and coupled to the second mass, with the two spindles connected colinearly with each other by a mechanical coupling element.

* * * * *